United States Patent Office 3,525,624

Patented Aug. 25, 1970

3,525,624

WATER ICE FLAVOR BASE AND COMPOSITION

Irving H. Rubenstein, Staten Island, N.Y., assignor to Harwood Specialties Corporation No Drawing. Filed Apr. 6, 1966, Ser. No. 540,518
Int. Cl. A23l *1/00*
U.S. Cl. 99—28 5 Claims

ABSTRACT OF THE DISCLOSURE

A free-flowing liquid flavor base made up of about 10% soya whipping protein, flavor, color, and fruit juice. The flavor base is combined with an ice water mix made up of sugar, corn syrup solids, guar gum, and carboxymethylcellulose in the proportion of about 1 quart of the flavor base to about 10 gallons of the ice water mix.

The present invention relates to the art of making water ices and drinks and more particularly to water ice flavor bases and compositions for use in the preparation of water ices and drinks.

Copending application Ser. No. 363,277, filed Apr. 28, 1964 (now Pat. No. 3,343,967 granted Sept. 26, 1967), describes certain stabilizer compositions which can be added to sugar water mixtures in such manner as to produce a product which can be readily whipped and frozen and which provides exact overrun control in the continuous filling of containers with equal amounts of water ices. By that invention it was made possible to provide continuous flow without encountering the usual difficulty of unincorporated air masses such as is common with conventional ices. The air masses usually accumulate in pockets and cause discontinuity in flow thus making it impossible to operate filling machines properly and efficiently in conjunction with the freezing equipment.

The stabilizer compositions of that application are made up of a combination of vegetable gums and derivatives thereof with or without carboxymethylcellulose in a water-soluble vehicle such as sugar or dextrose and to this basic material soya proteins were added as a whipping aid. This unique combination provides excellent stabilization for the intended purposes.

In accordance with the present invention, it has now been found that the manufacturer can be permitted to use whatever combination of gums he desires depending upon whether he is pasteurizing the ice water base or producing a cold water mixture. Thus, by adding the proper amount of whipping protein to the flavor, the present invention produces a flavor base yielding an excellent water ice with all the qualities mentioned in the aforesaid copending application. The present invention has the added advantages of simplicity and versatility and thus offers the manufacturer new and heretofore unavailable techniques. At the same time, new and modified compositions can be produced by combining the present flavor base which is a free-flowing liquid with the ice water mix. The flavor base is preferably used in the amount of 1 quart to each 10 gallons of ice water mix, but it is to be understood that these proportions can be somewhat varied without losing the benefits of the invention.

For example, an ice water mix is prepared containing 20% sugar, 6% corn syrup solids, 0.16% guar gum and 0.1% carboxymethylcellulose. This mixture can be dissolved either hot or cold as desired by the manufacturer.

The foregoing proportions are not intended to constitute a limitation upon the invention because relatively wide variations may be made, especially as to the sugar solids and can in fact be used with any standard ice water stabilizer. A free-flowing liquid flavor base is separately made up so that it contains 10% whipping protein, e.g., soya protein such as soya albumin, together with the desired amounts of flavor and color and such amount of fruit juice as will comply with Federal Regulations regarding juice content, as well as providing proper taste and appearance. The flavor base and the ice water mix are then combined in the preferred proportions of 1 quart of the former to 10 gallons of the latter.

In a modified form of the invention and as a further example thereof where it is desired to add large quantities of fruit juice or fruit puree to an ice water mix, the whipping protein, such as soya albumin, and gums are added to a concentrated sugar syrup. This has the advantage that it can be made in the syrup or flavor factory and hence, the freezer operator need only add water. In carrying out this form of the invention a free-flowing syrup blend is made up containing 15% pureed fruit, 0.32% guar gum, 0.20% carboxymethylcellulose, 0.40% whipping protein and sufficient sugar to bring the concentration up to a total solids content of 60%. This syrup blend then need only be diluted with its own volume of water to prepare the freezing mixture which can be readily handled in all types of ice cream freezers without encountering the sticking or lubrication problems described in the said copending application.

As a still further illustration of the useful properties of the above-described syrup, a semi-viscous cold drink with a fruit juice base can be produced by adding equal quantities of water and ice at a soda fountain. The mixture is then agitated in a standard blendor or "malted milk machine" whereby a thick viscous drink is produced simulating the richness of malted milk while lacking the expense and caloric value of milk drinks and having a fine fruit flavor which is not masked by milk solids. By suitably altering the proportions of the ingredients the drink can be made of any desired viscosity, even to the point where it is so viscous that it is necessary to eat it with a spoon as it is non-flowable.

The foregoing is intended as illustrative and not as limitative and represents a significant advance over and modification of the invention of the said copending application and existing techniques. The present invention provides an unusually simple and practicable means for making water ices and drinks which are pleasing in taste and nutritious but without a high caloric value.

What is claimed is:

1. A composition for the manufacture of water ices consisting of a flavor base which contains 10% of whipping soya protein, flavor, color and fruit juice and an ice water mix containing about 20% sugar, 6% corn syrup solids, 0.16% guar gum and 0.1% carboxymethyl cellulose, the flavor base and ice water mix being combined in the proportions of about 1 quart of the former to about 10 gallons of the latter.

2. A free-flowing syrup blend containing about 15% pureed fruit, 0.32% guar gum, 0.20% carboxymethylcellulose, 0.40% whipping soya protein and sufficient sugar to produce a 60% total solids content concentration.

3. A freezing composition for water ices comprising equal parts of the syrup of claim 2 and water.

4. A semi-viscous cold drink comprising the syrup blend of claim 2 with equal quantities of water and ice.

5. A viscous composition according to claim 4 in which the viscosity is such that the composition is non-flowable.

References Cited

UNITED STATES PATENTS

| | | | |
|---|---|---|---|
| 2,400,460 | 5/1946 | Hall | 99—206 |
| 2,555,849 | 6/1951 | Glabe | 99—136 |
| 2,588,419 | 3/1952 | Sevall et al. | 99—114 |
| 3,335,013 | 9/1967 | Wolfmeyer | 99—136 |
| 3,346,387 | 10/1967 | Moncrieff et al. | 99—105 X |

A. LOUIS MONACELL, Primary Examiner

S. B. DAVIS, Assistant Examiner

U.S. Cl. X.R.

99—78, 105, 136, 142